3,489,574
FOOD PRODUCT AND PROCESS
Robert N. Du Puis, Chappaqua, N.Y., assignor to General Foods Corporation, White Plains, N.Y., a corporation of Delaware
No Drawing. Filed Feb. 20, 1967, Ser. No. 617,046
Int. Cl. A23l 3/34; A23b 1/14
U.S. Cl. 99—150                                      10 Claims

ABSTRACT OF THE DISCLOSURE

Processes of stabilizing semi-moist food products, comprising incorporating amylaceous and saccharidal hydrogen-olyzate products having predominately sub-hexosic alcohols as part of the solution in the matrix of said semi-moist foods.

---

This invention relates to the formulation of semi-moist food products and the stabilization thereof by inclusion therein of a hydrogenolyzed hydrolyzate of amylaceous material, said hydrogenolyzate comprising a substantial amount of dihydric and higher starch-derived alcohols having carbon chain lengths less than six and commonly three carbon atoms, which hydrogenolyzate may be employed as a minor or major substituent solute in stabilizing solutions infusing the matrix of said semi-moist foods. It will be understood that the term "solute" as employed hereinafter refers to the water dissolved component or components of a heterogenous stabilizing system and is meant to apply to solids or liquids that are intended to be dissolved in aqueous mediums but which may be incompletely dissolved therein.

The food industry and particularly the pet food industry has witnessed the emergence in recent years of a number of intermediate moisture animal food products having a matrix of meat and/or vegetable materials of desired nutritional value stabilized by a solution high in sugar solids and other water soluble compounds such as salt, propylene glycol and the like. By virtue of the high concentration of such solids and the overall effect thereof in increasing the osmotic pressure of solutions that infuse the matrix materials, it has been possible to stabilize a substantially pasteurized semi-moist matrix of 15–30% moisture to the extent that it can be non-hermetically aerobically packaged—as by allowing the matrix to be shaped, cooled to ambient conditions and then wrapped in loose cellophane enwrapment. The sugar of use may be sucrose, dextrose or like commonly available saccharides.

Such sugars are comparatively expensive sources of stabilizing water soluble solids when employed in the form of cane sugar, for instance. Moreover, it has been demonstrated that the molecular weight of such sugars is such that at least 15% and usually more must be added to stabilize a semi-moist or intermediate moisture animal food; ref. U.S. patent to Burgess et al., No. 3,202,514, issued Aug. 24, 1965. To be sure, the employment of a solids source such as dextrose calls for a comparatively smaller amount of dextrose than of sucrose to achieve requisite bacteriostatic and fungistatic stabilization at a given moisture level. However, such hexosic saccharidal materials have reactive aldehydic groups which in the case of dextrose, for instance, readily enter into the classical Maillard reaction at the intermediate moisture range employed, resulting in an undesirable darkening of product, particularly at elevated storage temperatures.

The object of the present invention is to stabilize semi-moist animal and like food products by the infusion therein of more functional and yet economic stabilizing solutes which can be both practically and economically derived, if convenient from crude amylaceous material and which can be converted to a form whereat the solutes exhibit improved functionality both from the standpoints of increased osmotic pressure and protection against undesirable color producing reactions. Such a solute should preferably be derivable from amylaceous materials which are not refined but rather may be in the crude natural condition or semi-processed state of astarch by-product or crude sugar intermediate, and should offer such an influence on the osmotic pressure of stabilizing solutions that infuse the food matrices that either a comparatively reduced weight percentage thereof may be employed in a foodstuff or foodstuff formulations of increased moisture level can be compounded.

In accordance with the present invention, partially or fully hydrongenolyzed sugars are employed as stabilizing solutes for semi-moist food matrices, the hydrogenolyzed saccharide preferably providing predominately sub-hexosic compounds that afford a greater effect per weight thereof in effecting bacteriostasis and fungistasis; the hydrogenolyzate will thus comprise sub-hexosic alcohols of three carbon atoms and higher and include in its constituency reduced but not hydrogenolyzed products such as sorbitol. Advantageously, the hydrogenolyzed saccharide contributes softening and humectant properties to those semi-moist products; by reason of the hydrogenolysis products' ability to retain product moisture, a more pliable plastic quality may be provided to a product which may be formulated from either animal, vegetable or both such materials as are set forth in great detail in said U.S. Patent No. 3,202,514.

According to the preferred emboiment of this invention amylaceous material is initially hydrolyzed so as to produce predominantly hexosic carbon chain lengths; thereafter this hydrolyzate is subjected to hydrogenolysis whereby substituent aldehydic groups are converted substantially to alcoholic groups and hexosic material is cleaved to sub-hexosic alcohols typically of three carbon atoms such as propylene glycol and glycerol and four carbon reduction products and higher including non-hydrogenolyzed materials such as sorbitol. Such hydrogenolyzates will exhibit such effects in stabilizing the aforesaid intermediate moisture products that they may be employed as total or partial substitutes for the "sugars" defined in the aforesaid Burgess et al. animal food composition in affording both color and microorganic stability and advanteageously can be employed at a comparatively lower level than such "sugars" for stabilizing a product at a given intermediate moisture content.

Thus, the present invention involves the inclusion as a substantial solute phase substituent, say at a level in excess of 5% and more typically in the neighborhood of 25–100% of the solute phase in an aqueous stabilizing solution, of a functional solute composition characterized by: (i) a low average molecular weight of hydrongenolyzed hexosic materials wherein sub-hexosic polyols predominate, (ii) the non-browning nature of such hydrogenolysis products even at high intermediate moisture product levels, and the beneficial humectant properties of the hydrogenolyzate product that can be imparted to stabilizable matrices.

A number of prior art processes are susceptible to use in accordance with the present invention, including that set forth in my U.S. Patent No. 2,282,603, issued May 12, 1942, entitled "Process for Hydrogenolysis of Crude Sugar Bearing Materials," disclosing a process for the hydrogenolytic conversion of low purity crude sugars to alcohols such as glycerol and glycol; U.S. Patent No. 2,201,235, issued May 21, 1940 to Charles W. Lenth and me, entitled "Catalyst and Process of Producing Same and Process of Employing said Catalyst in Hydrogenation Reactions"; and U.S. Patent No. 2,290,439, issued July 21, 1942 to Charles W. Lenth and me, entitled "Hydrogenolysis Process," all of which arts are now well understood by those skilled-in-art and may be found in class 260, subclass 65 in the U.S. Patent Office official classification system of patents.

In general, such hydrogenolysis processes call for inclusion of a hydrogenolysis catalyst into a sugar or starch hydrolyzate solution and introduction of hydrogen under pressure whereby the hexosic constituency is reduced and molecularly cleaved to yield both glycerol and propylene glycol as well as four carbon atoms and higher alcoholic residues. The economic advantages of the present process are best realized when a crude amylaceous material such as corn meal or corn flour has been liquefied as by treatment with an enzyme such as alpha amylase or by treatment with an acid; is simultaneously or subsequently saccharified to mono- and higher saccharides, depending upon conversion efficiency; and is thereafter hydrogenolyzed, incident to which the hexosic monomer will have its aldehydic groups reduced to methylol groups and will be cleaved to yield diols and polyols. However, instead of saccharifying a liquefied starch, the amylolytically treated material may be hydrogenolyzed directly, in which event oligosaccharides and sugars generally as that term is employed in said Burgess et al. patent will be similarly reduced and molecularly cleaved to yield sub-hexosic polyols.

Further, it should be understood that for some applications of this invention, one may only partially hydrogenolyze the mono-saccharidal and/or higher sugars as defined by Burgess et al., in which event the sugars will be partially or fully reduced, a lesser amount of sub-hexosic polyols will be present, and higher carbon chain cleavage products will be present as a higher boiling residue, the constituency of the hydrolyzate being thus effected by variations in hydrogen pressure, the degree of agitation and the degree of purification or distillation employed to remove lower boiling constituents such as propylene glycol and glycerol, all of which variations are well known to those skilled-in-the-art.

One embodiment of the present invention will involve treatment of a crude amylaceous material or a refined starch with an alpha amylase that is substantially protease-free and the continuance of such treatment to liquefy the amylaceous material, whereafter the enzyme may be inactivated by elevating the starch slurry to a temperature in excess of, say, 180° F., followed by saccharifying the slurry by a malt enzyme or an amyloglucosidase of either a high or low order of purity depending upon the desired efficiency for conversion to glucose, thereafter inactivating the saccharifying enzyme as by heat to a temperature of 180° F. or above, and then hydrogenolyzing the glucose-containing solution according to the embodiment of the hereinafter cited Industrial and Engineering Chemistry reference to yield a hydrogenolysis product containing as a major weight substituent a propylene glycol and glycerol mixture; typically this hydrogenolysis may be carried out in accordance with the process set forth by said Lenth and me, described fully in Industrial and Engineering Chemistry, volume 37, pages 152–157 (1945) entitled "Polyhydric Alcohol Production by Hydrogenolysis of Sugars in the Presence of Copper-Aluminum Oxide"; a hydrogenolysis product of the kind produced by the process described on pages 154 and 155 of said article was replicated and incorporated into an intermediate moisture animal food formulated as set forth in the accompanying operative examples and for further understanding of the present invention therefor, reference is made to said operative examples.

EXAMPLE

Stabilization and browning effects of various hydrogenolyzed dextrose compounds relative to dextrose and sucrose in intermediate moisture meat- and vegetable-containing food products were evaluated in the following manner.

A meat slurry containing 18 parts bovine tripe, 6 parts bovine udders, 4 parts beef cheek trimmings, 4 parts gullets and approximately 2 parts propylene glycol was charged together with 20 parts test solutes specified hereinbelow to a sigma blade Day mixer (jacketed for circulation of steam and/or water therearound) which had been preheated for five minutes by steam at a pressure of 28 p.s.i.g. This meat slurry was mixed for 1½ minutes at the stated steam pressure, the Day mixer being covered and the product being maintained at a temperature of 210–212° F. Thereafter the steam supply to the Day mixer was shut off by opening a steam by-pass and mixing was continued for thirteen minutes. The thus pasteurized meat slurry was blended in the Day mixer with a pre-blended dry mix and liquid additives, the dry mix containing 32 parts soy flakes, 3.0 parts soy hulls, 3 parts dibasic calcium phosphate, 2.5 parts milk replacer, 1 part sodium chloride, 3.5 parts vitamins, coloring, minerals and spices, 0.3 part potassium sorbate and liquid constituents comprising 1 part bleachable fancy tallow and 1 part mono- and diglycerides. This mixture was then covered, the Day mixer was again subjected to steam as before by closing the steam by-pass valve and charging steam at 28 p.s.i.g. to the jacket thereof for three minutes or until the product reached a temperature of 200° F. Thereafter the steam supply was disconnected by opening the by-pass from the Day mixer and the cooked mixture was quenched by turning on cool water which was circulated through the jacket to cool the product to ambient conditions, i.e., 15 minutes, cooling the product to a temperature of 80° F.

The cooled mix was extruded by a meat grinding attachment into strands which were in turn subdivided and hand molded into patties which were then wrapped in a cellophane wrapping material and set aside for storage and color studies which will be set forth herein as part of these operative examples.

Test solutes were included in three separate samples, formulated and processed as in the preceding example of semi-moist products; one being formulated and processed to contain sucrose as the test solute for establishing an acceptance standard, coded A; a second being formulated like the first but containing dextrose as test solute, coded Sample B; and a third sample identical to A and B but containing as test solute a hydrogenolyzed dextrose replicate of the type produced as set forth in Lenth and my cited Industrial and Engineering Chemistry publication hereinabove, coded Sample C. This latter test solute consisted of a mixture of 51.2% propylene glycol, 35.3% of glycerine, and sorbitol 13.5%.

Listed in tubular form below are comparative Hunter Color readings for the samples coded A–C hereinabove after 8 weeks storage, the lower a Hunter color reading, the darker the product. It will be noted that whereas a dextrose sample included in an intermediate moisture formulation underwent a significant darkening in product as demonstrated by the reduced L and a values, the intermediate moisture product containing hydrogenolyzed dextrose was quite stable as evidenced by the substantial identity of the initial and 8-week color readings for Sample C. At the end of twelve weeks, Sample C was not only microbiologically stable, but also it displayed similar resistance to browning despite the derivation thereof from monomeric saccharidal material which would normally undergo browning. It will be noted that sample C approximated the color acceptability standard; sample A, indicating the efficacy of such a hydrogenolyzate.

HUNTER COLOR READINGS

| Intermediate moistures | L value | | a Value | |
| --- | --- | --- | --- | --- |
|  | Init. | 8 wks. | Init. | 8 wks. |
| (A) Sucrose | 37.8 | 39.0 | 11.2 | 13.7 |
| (B) Dextrose | 39.3 | 33.0 | 11.2 | 7.6 |
| (C) Hydrogenolyzed Dextrose Replicate | 39.6 | 37.1 | 11.2 | 12.3 |

Although the invention will be applicable to the hydrogenolysis of mono-saccharidal, di-saccharidal and tri-saccharidal materials, e.g., dextrose, sucrose and maltotriose, it can be employed also for the advantageous enhancement of other "sugars" as that term is defined in the Burgess et al. patent aforesaid.

A variety of amylaceous materials, and mono-saccharides, can be treated by hydrogenolysis and as a consequence will result in the production of quantities of diols and triols such as propylene glycol and glycerol. For example, a crude starch material such as corn flour may be liquefied amylolytically by enzyme or by acid, preferably by an amylase, and thus liquefied amylaceous material may be subjected to hydrogenolysis. For example, the liquefied starch slurry can be charged to a reaction vessel maintained at an elevated temperature and a pressure to achieve the cleavage of starch, the reaction being carried out in a medium of gaseous hydrogen and the reaction mixture having added thereto a suitable hydrogenolysis catalyst of the type set forth in the foregoing cited publication. Preferably, in lieu of hydrogenolysis after liquefication and before saccharification, the startch slurry will be saccharified as indicated previously to produce a high percentage of monosaccharidal (hexosic) constituents, which constituents will then be subjected to hydrogenolysis.

Although the invention has been described by reference to specific operative examples, it is not to be restricted in scope thereto but rather is susceptible to a wide range of applications for the stabilization of foodstuffs generally, which foodstuffs will commonly have meaty and/or vegetable matrix either separately or in combination serving as matrix materials.

And although it is contemplated as a preferred mode of the present invention that the hydrogenolyzed sugar would be employed at such levels that sub-hexosic by-products of hydrogenolysis comprises a major weight percent of the solutes in the stabilizing solution infusing the intermediate moisture product, the invention is not to be restricted in scope either in terms of the degree of the hydrogenolysis or the extent of the use of the hydrogenolyzate, inasmuch as such matters are within the realm of choice and experimentation depending upon the composition being formulated and the need for bacteriostasis and fungistasis therein. Moreover, although semi-moist products ranging from 15–30% moisture will be stabilized by employing the hydrogenolyzate, together with other solutes at a level exceeding the moisture level of a given food product and such practice is one preferred embodiment contemplated herein by the operative example, the hydrogenolyzate may be employed instead in other formulations wherein the total solutes present may be less than the moisture present in a given formulation.

Indeed, the hydrogenolyzate will permit formulation of higher moisture products than 30%, such as those having a moisture content as high as 40% and typically about 35%, in which formulations the level of total solutes including the hydrogenolyzate can advantageously be less than the moisture present; this advantage accrues particularly for formulations containing food grade acidulants such as phosphoric, malic, citric or like acids and their acid salts, which when used in a formulation will adjust its pH from a neutral one of, say, 6–8 to one in the order of 3.5–5.9. For some animal food such as cat food it appears that felines enjoy a more moist product than one having a level less than 30% water. Also, such high moisture feline foods seem to be benefited palatability-wise when an acidulant is employed, and so the formulation will be advantageously stabilized against putrefaction and other micro-organic decomposition by the hydrogenolyzate as part of the total solute phase in combination with the hydrogen ion activity of the food acid.

Thus, the applicability of the hydrogenolyzate of use in accordance with this invention is not to be in any way restricted to products having either neutral or acidic pH's and instead advantages ascribed will be found to flow under various pH's as well as under moisture levels higher than 30%. For the purposes therefor of the present application, the term "semi-moist" will be understood to apply to products ranging in moisture content from 15–40% by total weight of the composition. Furthermore, whereas the formulations described herein are of the animal or pet food variety, the benefits of micro-organic stabilization will be likewise applicable to human foods wherein the hydrogenolyzate will similarly serve as a stabilizing solute. Among the human foods which will be so stabilized are sausage-like formulations, liquid preparations such as syrups, simulated cheeses containing vegetable and/or dairy solids and the like. All such products will be pasteurized by an elevation to a temperature whereat substantially all pathogenic organisms will be destroyed, say at a temperature of 180° F., and whereafter the thus pasteurized formulation may be either asceptically packed or more advantageously cooled and aerobically packed in a non-hermetic wrapper such as cellophane, whereupon such packaged products can be stored without refrigeration for periods of 3 to 6 months or longer.

In all the foregoing products the hydrogenolyzate will have such humectant properties and such effects on osmetic pressure that they will be more functional than "sugars" of equal weight and will exhibit fungistasis as well as bacteriostasis. Advantageously, also, the reduction of hexosic saccharides and other reducing saccharides through hydrogenolysis and the consequent conversion of the aldehydic substituents to alcoholic methylol groups will permit the employment of some levels of reducing saccharides such as dextrose; as a consequence the dextrose can be employed in combination with the hydrogenolyzate as the major stabilizing solute.

As indicated previously, hydrogenolysis as practiced in accordance with the present invention may be complete or partial depending upon the degree of reduction of aldehydic groups and the extent of production of sub-hexosic polyols like glycerol desired. For most applications complete hydrogenolysis to the extent practical and economical will be practiced, but in some applications where the desiderata of plasticity, product softness and preference for a high moisture level is not as great, partial hydrogenolysis may be practiced.

Generally, hydrogenolysis will involve subjecting the sugar in either alcohol or aqueous solution at pressures in the order of 200–2000 lbs. hydrogen at, say, 200° C. or above in the presence of a catalyst to give an absorption and reaction with hydrogen visible by changes in gauge pressure, the catalyst for such hydrogenolyzation being any one of a number promoters well known in the art although the use of such catalysts is not necessary but only preferred.

In most applications, it will be practical to employ a sugar such as dextrose and incompletely hydrogenolyze the sugar under the aforesaid conditions in which instances the hydrogenolyzate will comprise lower boiling alcohols such as propylene glycol and glycerol and a higher boiling residue possessing economic advantage and utilization benefits in accordance with the present invention. The hydrophilic character of the four carbon and higher chain length organic constituency of such residues, as well as the presence in the hydrogenolyzate of reduced sugars, to-wit, sorbitol, all of which have a sufficiently low molecular weight to function in the capacity of bacteriostats and fungistats, such partial hydrogenolyzates achieve a functional increase in osmotic pressure for stabilizing and infusing solutions of use in accordance with this invention.

For an understanding of the scope of the invention therefore, reference should be had to the accompanying claims.

What is claimed is:

1. In the process of stabilizing semi-moist food products having a moisture content of 15–40% and requiring bacteriostasis and fungistasis by incorporation in a matrix for said food products a stabilizing solution of water soluble solutes, the improvement which comprises incorporating hydrogenolyzate products, having predominantly sub-hexosic alcohols formed from materials selected from the group consisting of amylaceous and saccharidal materials, as part of said solution in said matrix for stabilization thereof.

2. The process of claim 1 wherein said amylaceous material is comprised of hexosic materials.

3. The process of claim 2 wherein said semi-moist products have a moist content of 15–30% and wherein the hydrogenolyzate is employed at a level of at least 5% by the weight of the solutes in said stabilizing solution.

4. The process of claim 2 wherein said saccharidal material is a mono-saccharide.

5. The process of claim 4 wherein said saccharidal material is glucose and wherein any unhydrogenolyzed aldehydic groups have been reduced to alcohol groups.

6. The process of stabilizing an intermediate moisture food product having a substantially pasteurized matrix containing a stabilizing solution of water soluble solids, comprising incorporating hydrogenolyzed products having predominantly sub-hexosic alcohols formed from materials selected from the group consisting of amylaceous and saccharidal materials, in said matrix at a level of at least 5% by weight of the solute phase in said stabilizing solution.

7. The process according to claim 6 wherein sub-hexosic polyols comprise a major percent by weight of the hydrogenolyzed products.

8. A semi-moist food product having a moisture content of 15–40% comprising a matrix of food materials containing a stabilizing solution of water soluble solids, and having a substantial fraction of sub-hexosic polyols as the hydrogenolyzed products formed from materials selected from the group consisting of amylaceous and saccharidal materials.

9. The composition of claim 8 wherein said hydrogenolyzed product is present in a range of 5–100% by weight of the solute phase in said stabilizing solution.

10. The composition of claim 9 wherein said hydrogenolyzed product comprises a major percent of weight of glycerol and propylene glycol, and wherein unhydrogenolyzed sugars have been reduced to alcohols and comprise a minor weight percent of the stabilizing solute.

References Cited

UNITED STATES PATENTS

| | | | |
|---|---|---|---|
| 2,282,603 | 5/1942 | Du Puis | 260—635 |
| 2,290,439 | 7/1942 | Lenth et al. | 260—635 |
| 3,115,409 | 12/1963 | Hallinan et al. | 99—2 |
| 3,202,514 | 8/1965 | Burgess et al. | 99—2 |

A. LOUIS MONACELL, Primary Examiner

J. M. HUNTER, Assistant Examiner

U.S. Cl. X.R.

99—2, 7, 18, 157